United States Patent
Sekaran et al.

(10) Patent No.: US 7,536,481 B2
(45) Date of Patent: May 19, 2009

(54) METHOD AND SYSTEM FOR RE-SYNCHRONIZING END POINTS WHEN AN INTERMEDIARY DETECTS THAT THE END POINTS MAY BE UNSYNCHRONIZED

(75) Inventors: Dhigha Sekaran, Redmond, WA (US); Ling-Cheung Aaron Lo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 11/067,430

(22) Filed: Feb. 25, 2005

(65) Prior Publication Data

US 2006/0209900 A1    Sep. 21, 2006

(51) Int. Cl.
  *G06F 15/16* (2006.01)
(52) U.S. Cl. .................. 709/248; 709/203; 709/217; 709/226; 709/228
(58) Field of Classification Search .......... 709/203, 709/217, 219, 226–228, 248
  See application file for complete search history.

(56) References Cited

U.S. PATENT DOCUMENTS

| | | | |
|---|---|---|---|
| 5,469,503 A * | 11/1995 | Butensky et al. | ............ 709/248 |
| 6,031,978 A * | 2/2000 | Cotner et al. | ............... 709/248 |
| 6,230,210 B1 | 5/2001 | Davies | |
| 6,341,316 B1 | 1/2002 | Kloba | |
| 7,100,070 B2 * | 8/2006 | Iwamura et al. | ................. 714/4 |
| 2002/0064149 A1 * | 5/2002 | Elliott et al. | ................. 370/352 |
| 2003/0002676 A1 * | 1/2003 | Stachura et al. | ............. 709/229 |
| 2006/0176805 A1 * | 8/2006 | Peters | ........................ 709/203 |

OTHER PUBLICATIONS

[rfc-dist] RFC 3265 on Session Initiation Protocol (SIP)-Specific Event Notification###Jul. 3, 2003 (3 pages) http://www.postel.org/pipermail/rfc-dist/2002-July/000033.html.
RFC 3261 (RFCC3261), Internet RFC/STD/FYI/BCP Archivies, SIP: Session Initiation Protocol, Copyright The Internet Society (2002) (209 pages) http://www.faqs.org/rfcs/rfc3261.html.
Ben-Ari, Mordechai, "Synchronizing Multiple Clients and Servers," Department of Science Teaching, Weizmann Institute of Science, Oct. 30, 2000 (14 pages).

* cited by examiner

*Primary Examiner*—Phuoc Nguyen
(74) *Attorney, Agent, or Firm*—Perkins Coie LLP

(57) ABSTRACT

A synchronization system establishes a session between a client end point and a server end point via an intermediary server of a server pool. When messages sent from the client end point to the server end point are received at the server pool and the intermediary server is unavailable, the messages are routed to a new intermediary server. The end points, however, may be unsynchronized as a result of the unavailability. The new intermediary server can detect that it is a new intermediary server for the session and assumes that the server end point and the client end point may be unsynchronized because of the unavailability. The new intermediary server then notifies the client end point that it may need to re-synchronize with the server end point.

20 Claims, 7 Drawing Sheets

METHOD AND SYSTEM FOR RE-SYNCHRONIZING END POINTS WHEN AN INTERMEDIARY DETECTS THAT THE END POINTS MAY BE UNSYNCHRONIZED

TECHNICAL FIELD

The described technology relates generally to data communications and, more particularly, to methods and systems for re-synchronizing end points.

BACKGROUND

Applications sometimes need to establish and manage a session between computing devices. A session is a set of interactions between computing devices that occurs over a period of time. As an example, real-time communications applications such as MICROSOFT WINDOWS MESSENGER or Voice over Internet Protocol ("VoIP") establish sessions between communicating devices on behalf of a user. These applications may use various mechanisms to establish sessions, such as a "Session Initiation Protocol" ("SIP"). SIP is an application-layer control protocol that devices can use to discover one another and to establish, modify, and terminate sessions between devices. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. Both of these specifications are incorporated herein in their entirety by reference.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client, which is generally a device that initiates SIP requests, or a user agent server, which is a device that generally receives SIP requests and responds to such requests. As examples, "IP-telephones," personal digital assistants, and any other type of computing device may be user agents. A device can be a user agent client in one dialog and a user agent server in another, or may change roles during the dialog. A proxy server is an entity that acts as a server to clients and a client to servers. In so doing, proxy servers intercept, interpret, or forward messages between clients and servers. A redirect server accepts a SIP request and generates a response directing the client that sent the request to contact an alternate network resource. A registrar is a server that accepts registration information from SIP clients and informs a location service of the received registration information.

SIP supports two message types: requests, which are sent from a client to a server, and responses, which are sent from a server to a client, generally when responding to a request. A SIP message is comprised of three parts. The first part of a SIP message is a "start line," which includes fields to indicate a message type and a protocol version. The second part of a SIP message comprises header fields whose values are represented as name-value pairs. The third part of a SIP message is the message's body, which is used to describe the session to be initiated or contain data that relates to the session. Message bodies may appear in requests or responses.

SIP messages are routed based on the contents of their header fields. To be valid, a SIP request should contain at least the following six header fields: To, From, CSeq, Call-ID, Max-Forwards, and Via. The To header field indicates the logical identity of the recipient of the request. The From header field indicates the logical identity of the initiator of the request. The Max-Forwards header field indicates the number of hops a request can make before arriving at its destination. As an example, if a message from device A transits device B before arriving at destination device C, the message is said to have made two hops (e.g., to devices B and C). The Via header field indicates the path taken by the request so far (e.g., a sequence of network addresses of devices through which the request has transited) and indicates the path that should be followed when routing the response. Various network devices may insert Record-Route header fields when forwarding a SIP message in an attempt to force subsequent messages in a dialog to be routed through the device. The Record-Route header field may contain an identifier (e.g., network address) for the device and parameters. Devices that handle a message may force the message to be routed to devices listed in a message's Route header field. The Route header field values may be based on the Record-Route header field values inserted by devices. These and other header fields are described in the SIP specification referenced above.

A common form of real-time conversation is provided by instant messaging services. An instant messaging service allows participants at end points to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant needs to know whether the intended participants are available to respond in real time to a message. If not, then communications via conventional electronic mail, voice mail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system (i.e., end point) or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of the presence service. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call.

FIG. 1 is a block diagram illustrating communications between a client computer system and a presence server. The client computer system 130 subscribes to presence information of a user that is provided to presence server 120 by that user's computer system. The client computer system and the presence server are considered to be end points of the communications. The client computer system communicates with the presence server via communications link 140 and a server pool 110. The server pool includes a load balancer 111, servers 112, and a server database 113. The server pool may provide SIP registration services and proxy services. The client computer system and the presence server register their location with the SIP registration service of the server pool using a SIP registration request. When the client computer system wants to subscribe to the presence information of a particular contact, the client computer system sends a SIP SUBSCRIBE request to the presence server. When the load balancer of the server pool receives the SIP SUBSCRIBE request, it selects a server to route the request through as an intermediary. The selected server may access the server database to identify the location of the presence server and forward the SIP SUBSCRIBE request to the presence server. The presence server then responds with a SIP 200 OK response assuming that it accepts the subscription. As the SIP SUBSCRIBE request travels on its way to the presence server, the route is recorded in the SIP header. All subsequent communications during that session travel through the recorded route. When the presence information of the contact changes, the presence server sends a notification message to the client computer system that travels through the same route.

A difficulty occurs when the intermediary server of the server pool fails. After a failure occurs, the presence server will continue to send notifications of changes in presence information to the client computer system via the failed intermediary server. Because the intermediary server has failed, the notifications will not be forwarded to the client computer system. As a result, the client computer system's presence information will become out of date or unsynchronized with the actual presence information of the contact stored in the presence server. It would be desirable to have a technique that would allow for presence information or other state information associated with a client and server to be re-synchronized when it is determined that the information may be unsynchronized.

SUMMARY

A method and system for re-synchronizing end points whose state information may have become unsynchronized is provided. A synchronization system establishes a session between a client end point and a server end point via an intermediary server of a server pool. The messages of the session are routed between the client end point and the server end point via the intermediary server. When messages sent from the client end point to the server end point are received at the server pool and the intermediary server is unavailable, the messages are routed to a new intermediary server. The end points, however, may be unsynchronized because some messages from the server end point may not have been routed to the client end point because of the unavailability of the intermediary server. The new intermediary server can detect that it is a new intermediary server for the session and assumes that the server end point and the client end point may be unsynchronized because of the unavailability. The new intermediary server can notify the client end point that it may need to re-synchronize with the server end point. Upon receiving the notification, the client end point can then perform the re-synchronization.

DETAILED DESCRIPTION

Figure 1:
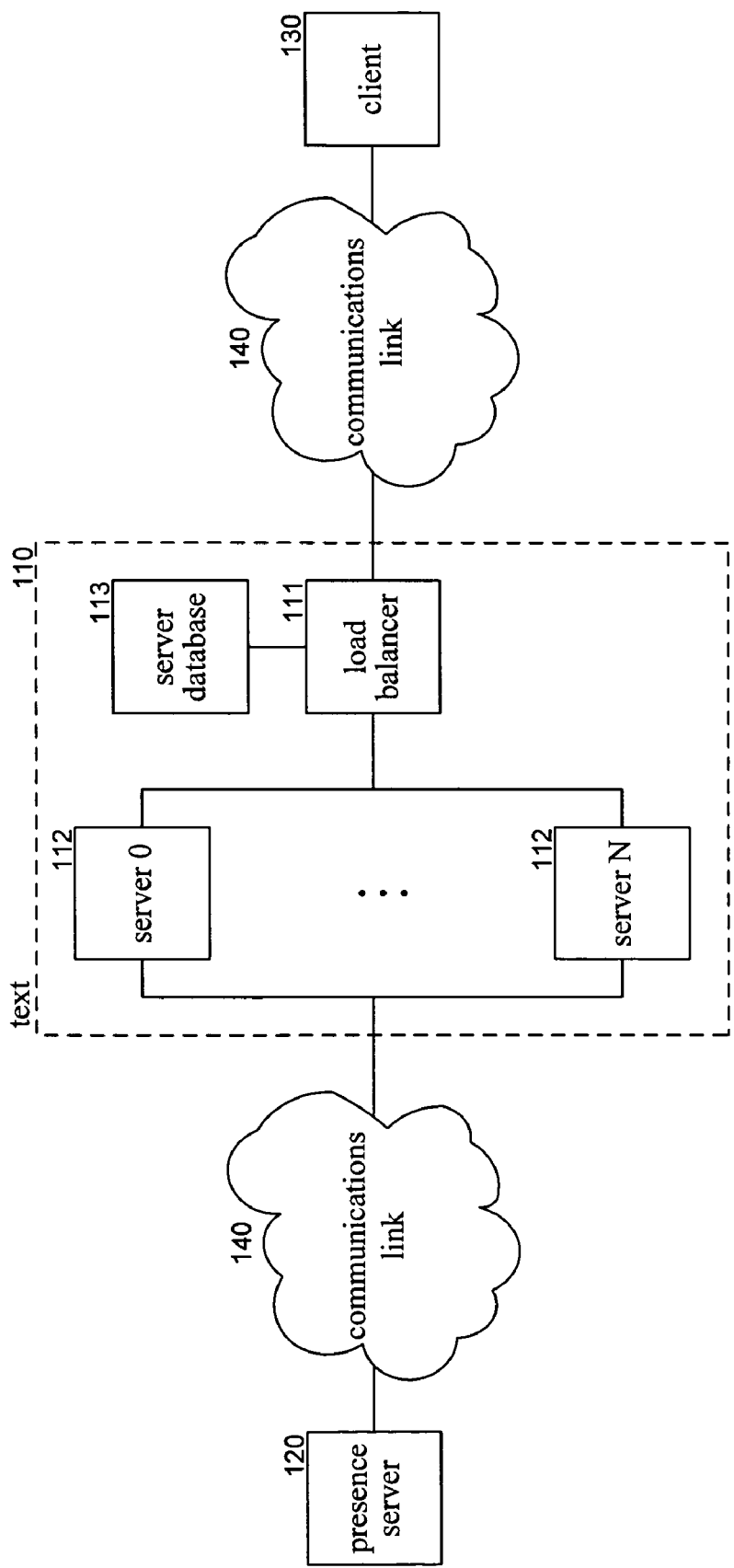
FIG. 1 is a block diagram illustrating communications between a client computer system and a presence server.

A method and system for re-synchronizing end points whose state information may have become unsynchronized is provided. In one embodiment, the synchronization system establishes a session between a client end point and a server end point via an intermediary server for that session. The messages of the session are routed between the client end point and the server end point via the intermediary server. For example, the server end point may be a presence server to which the client end point subscribes. The intermediary server may be a server of a server pool that provides registration and proxy services for the end points. When the intermediary server fails, messages sent from the server end point to the client end point will not be delivered when the communications protocol requires that messages of a session be routed along the same path. Continuing with the example, the client end point will stop receiving presence information notifications and its presence information will become out of date or unsynchronized with the presence server. When messages sent from the client end point to the server end point are received at the server pool, the messages are routed (e.g., by a load balancer) to a new intermediary server because of the failure. From the perspective of the client end point, the server pool provides a single point on the route from the client end point to the server end point. When the new intermediary server receives the message, it may then forward the message to the server end point and update the route for the session. The client end point, however, may be unsynchronized because some messages from the server end point were not routed to the client end point. For example, the client end point may not have received a message indicating that a certain contact has logged off and thus may attempt to communicate with the contact via instant messaging. The new intermediary server can, however, detect that it is a new intermediary server for the session and assume that the server end point and the client end point may be unsynchronized because of a failure. In such a case, the new intermediary server can notify the client end point that it may need to re-synchronize with the server end point. Upon receiving the notification, the client end point can then perform the re-synchronization. For example, when the server end point is a presence server, the client end point can re-subscribe to the presence information of its contacts. By re-subscribing, the presence server will provide to the client end point the current presence information for those contacts. In this way, when a client end point may be unsynchronized with a server end point, an intermediary server can detect that the end points may be unsynchronized and notify the client end point so that the end points can be re-synchronized.

In one embodiment, the synchronization system is used in the context of a session initiated using SIP. To establish a subscription session between a client end point and a server end point, the client end point first registers with a SIP registration service. The client end point can then subscribe to services of the server end point. The server end point may periodically send notifications relating to subscribed-to information to the client end point. For example, when the client end point subscribes to presence information of a contact, the presence server sends updated presence information for that contact to the client end point via the intermediary server. If, however, the intermediary server fails, the notifications will not be received by the client end point. If the client end point periodically sends out SIP registration requests to re-register with the SIP registration service provided by the server pool, the synchronization system can detect that the client end point and the server end point may be unsynchronized and thus should be re-synchronized. After the intermediary server fails, the server pool will assign a new intermediary server when a message, such as a SIP registration request, is received from the client end point. The new intermediary server can determine whether it has been newly assigned to the session. If so, then it may assume that the assignment was the result of the previous intermediary server having failed. If the previous intermediary server has failed, then the client end point and the server end point may be unsynchronized. The new intermediary server sends a response to the client end point indicating that the client end point and the server end point may be unsynchronized. Upon receiving the response, the client end point can request re-synchronization with the server end point. For example, when the server end point is a presence server, the client end point may re-subscribe to the presence information of its contacts.

Figure 2:
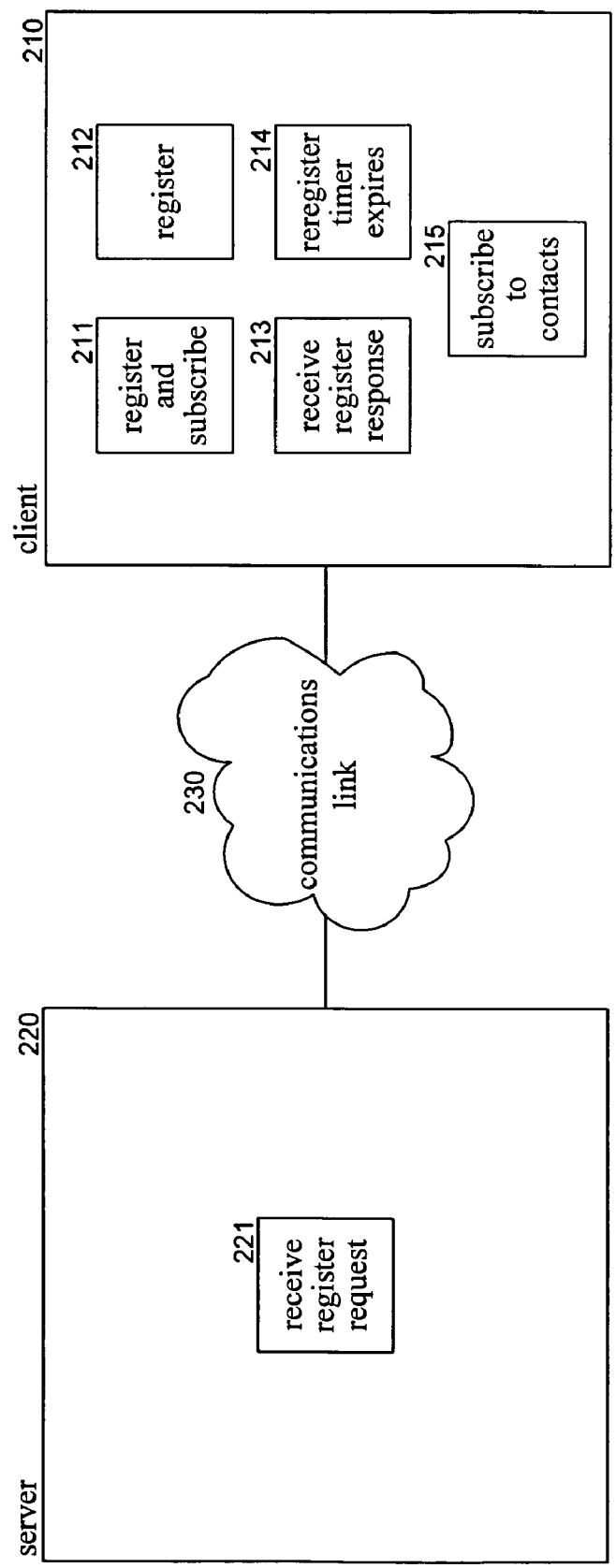
FIG. 2 is a block diagram that illustrates components of the synchronization system in one embodiment.

FIG. 2 is a block diagram that illustrates components of the synchronization system in one embodiment. The synchronization system includes client-side components and server-side components. The server-side components execute on an intermediary server. The client end point 210 is connected to an end point (e.g., another computer system not shown) via an intermediary server 220 using a communications link 230. The client end point may include a register and subscribe component 211, a register component 212, a receive register response component 213, a re-register timer expires component 214, and a subscribe to contacts component 215. The register and subscribe component is invoked when an application wants to register with a registration service and then subscribe to the services of a server end point. The register and subscribe component invokes the register component and the subscribe to contacts component. The register component registers the client end point with the SIP registration server. The register component is invoked periodically (e.g., every 10 minutes) to re-register the client end point with the SIP registration service. The register component sets a re-register timer for performing the re-registration. The receive register response component is invoked when a response (e.g., a 200 OK response) to a register request is received. When the response indicates that the client end point and the server end point may be unsynchronized, the receive register response component re-synchronizes the end points by invoking the subscribe to contacts component to re-subscribe to the server end point. The re-register timer expires component is invoked whenever the re-register timer expires and invokes the register component to re-register the client end point with the registration service. The subscribe to contacts component subscribes to the services provided by the server end point. The intermediary server includes a receive register request component 221. The receive register request component is invoked when the intermediary server receives a register request from a client end point. The receive register request component determines whether the state of the client end point and the server end point may be unsynchronized. For example, the receive register component may determine whether the intermediary server has been newly assigned to the session between the client end point and the server end point. If it is determined that the end points may be unsynchronized, then the receive register request component indicates so in the response that it sends to the client end point.

Figure 3:
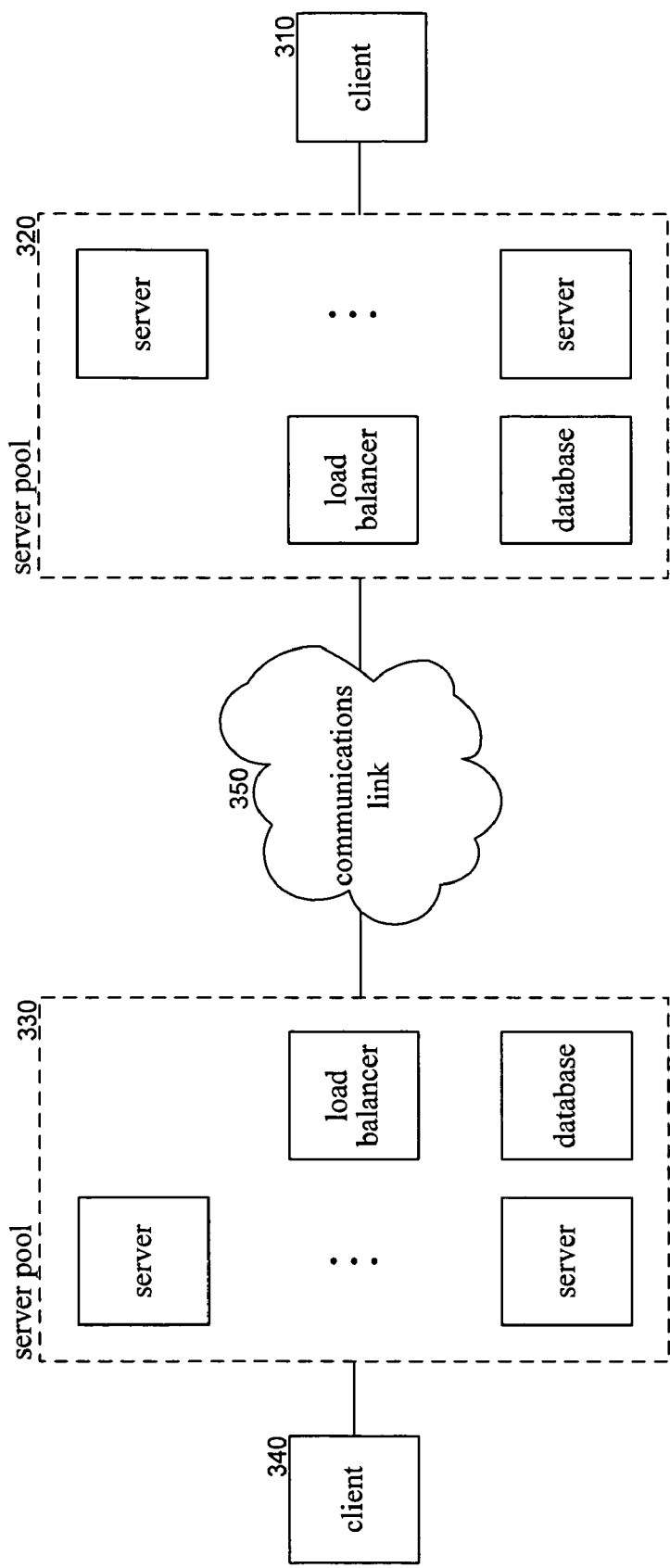
FIG. 3 is a block diagram illustrating a scenario in which the synchronization system allows communications between server pools to be optimized.

FIG. 3 is a block diagram illustrating a scenario in which the synchronization system allows communications between server pools to be optimized. In this scenario, client end point 310 communicates with client end point 340 via a server pool 320, a communications link 350, and a server pool 330. This scenario may occur, for example, in a large enterprise with thousands of users who need to communicate in real time. To accommodate the large number of users, the enterprise may establish server pools for different geographic regions and connect the users of each region to its server pool and interconnect the regional server pools. Traditionally, the servers of a server pool would persistently store session information in a database that is shared by the servers so that when messages are received by the load balancer of the server pool, it can route the messages through any one of the servers, which could then retrieve the session information from the database. If a server fails, then the load balancer would continue to route messages through the other servers and all the messages could be delivered. There is a high overhead, however, incurred by having to persistently store session information in the database. A server pool could instead opt to cache the session information in a server and route all messages of a session through the same server. This option would avoid the high overhead of storing the session information in the database and it would allow messages to be sent directly to the server rather than to the load balancer of the server pool. However, if the server fails, then the cached session information is lost without an effective way to recover. When one server receives a message (e.g., a SIP registration request) from its client end point, it can detect that the other server has failed. The server can then notify its client end point that the end points may be unsynchronized. The notified client end point can then perform the re-synchronization.

The computing device on which the synchronization system is implemented may include a central processing unit, memory, input devices (e.g., keyboard end pointing devices), output devices (e.g., display devices), and storage devices (e.g., disk drives). The memory and storage devices are computer-readable media that may contain instructions that implement the synchronization system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the synchronization system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The synchronization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
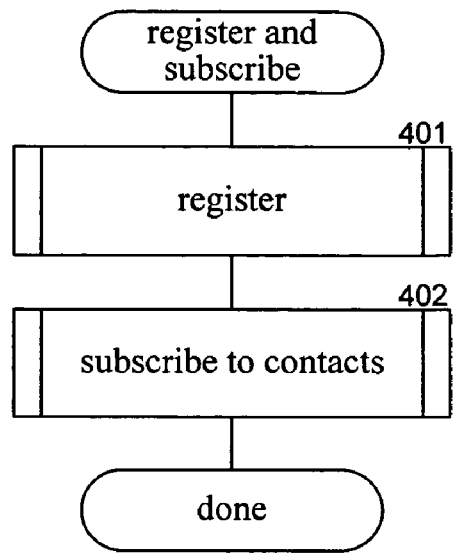
FIG. 4 is a flow diagram that illustrates the processing of the register and subscribe component of the client side of the synchronization system in one embodiment.

FIG. 4 is a flow diagram that illustrates the processing of the register and subscribe component of the client side of the synchronization system in one embodiment. The register and subscribe component is invoked by an application that wants to subscribe to services of a server end point, which in this embodiment is a presence server. In block 401, the component invokes the register component to register with a SIP registration service. In block 402, the component invokes the subscribe to contacts component to subscribe to the presence information of various contacts. The component then completes.

Figure 5:
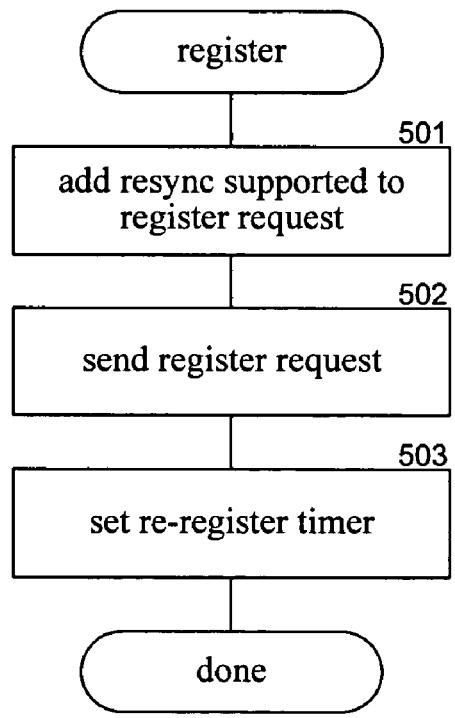
FIG. 5 is a flow diagram that illustrates the processing of the register component of the client side of the synchronization system in one embodiment.

FIG. 5 is a flow diagram that illustrates the processing of the register component of the client side of the synchronization system in one embodiment. The component performs the SIP registration for the client end point and sets a timer for re-registration. In block 501, the component adds a re-synchronization supported attribute to the SIP register request. The re-synchronization supported attribute indicates that the client end point supports re-registration. In block 502, the component sends the register request to the SIP registration service. In block 503, the component sets a re-register timer and then completes.

Figure 6:
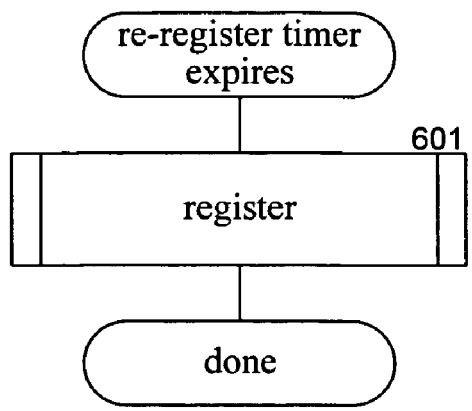
FIG. 6 is a flow diagram that illustrates the processing of the re-register timer expires component of the client side of the synchronization system in one embodiment.

FIG. 6 is a flow diagram that illustrates the processing of the re-register timer expires component of the client side of the synchronization system in one embodiment. The component is invoked when the re-register timer expires. In block 601, the component invokes the register component to re-register the client end point and reset the timer. The component then completes.

Figure 7:
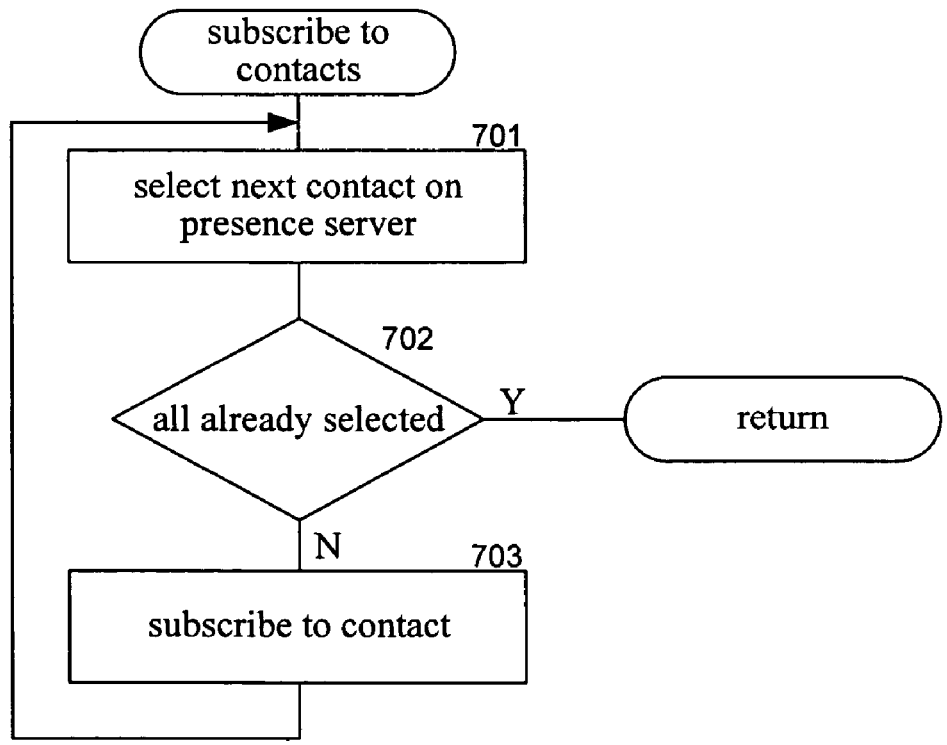
FIG. 7 is a flow diagram that illustrates the processing of the subscribe to contacts component of the client side of the synchronization system in one embodiment.

FIG. 7 is a flow diagram that illustrates the processing of the subscribe to contacts component of the client side of the synchronization system in one embodiment. The component loops selecting each contact and sending a subscribe request to the presence server for that contact. In block 701, the component selects the next contact associated with the presence server. In decision block 702, if all the contacts have already been selected, then the component returns, else the component continues at block 703. In block 703, the component sends the subscribe request for the contact to the presence server and then loops to block 701 to select the next contact.

Figure 8:
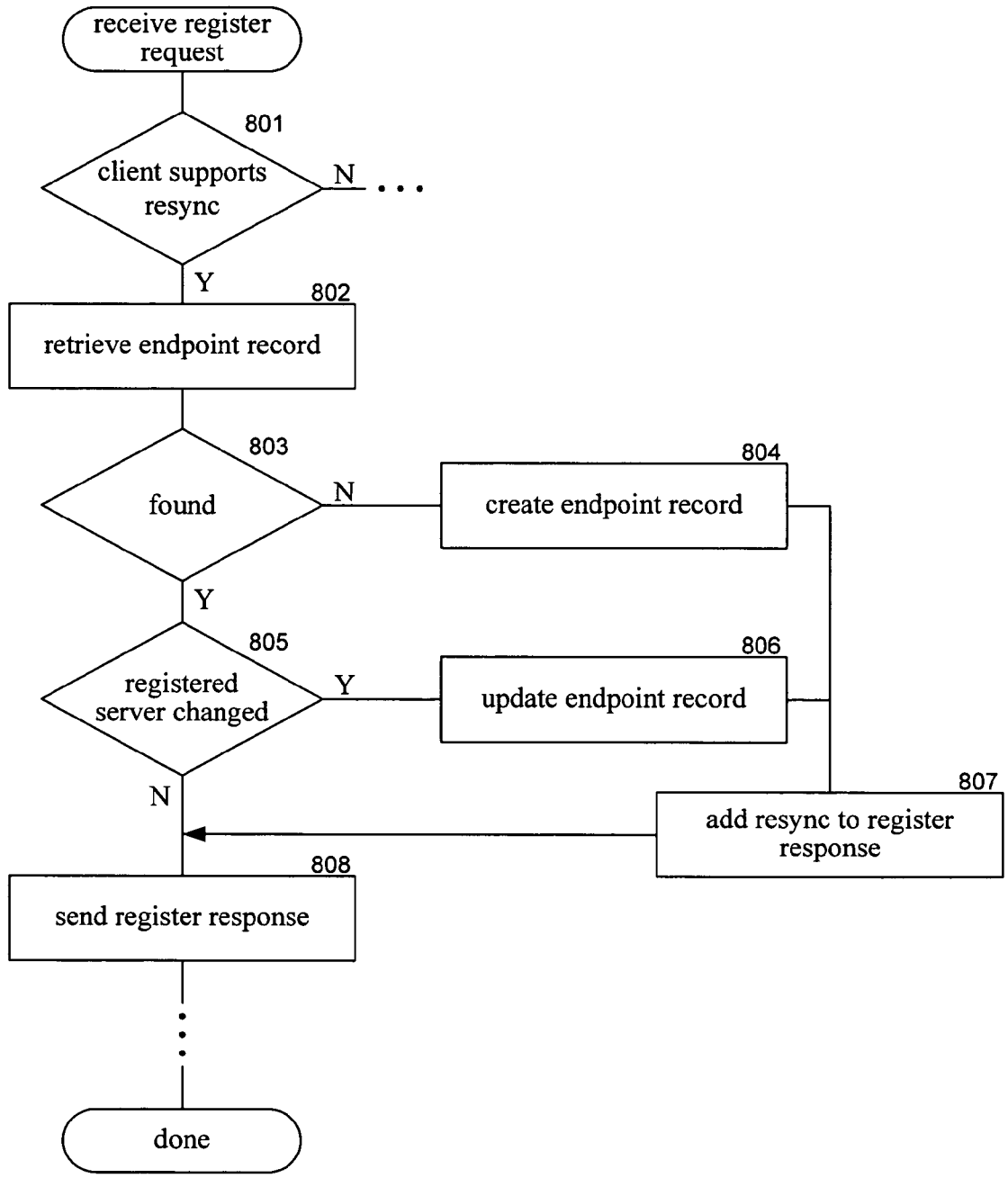
FIG. 8 is a flow diagram that illustrates the processing of the receive register request component of the server side of the synchronization system in one embodiment.

FIG. 8 is a flow diagram that illustrates the processing of the receive register request component of the server side of the synchronization system in one embodiment. The receive register request component is invoked when an intermediary server receives a register request. The component determines whether the client end point supports re-synchronization and, if so, notifies the client end point to re-synchronize when it determines that the client end point and the server end point might not be synchronized. In decision block 801, if the client end point supports re-synchronization (e.g., as indicated in the register request), then the component continues at block 802, else the component processes the request in a conventional manner. In block 802, the component retrieves the session information for the client end point. In decision block 803, if the session information was retrieved, then a session had previously been established and the component continues at block 805, else the component continues at block 804. In block 804, the component stores the session information of the new session for the client end point. In decision block 805, if this intermediary server is a new intermediary server for the session, then the component continues at block 806, else the component continues at block 808. In block 806, the component updates the session information and then continues at block 807. In block 807, the component adds a re-synchronized attribute to the register response to indicate that the client end point may need to be re-synchronized with the presence server. In block 808, the component sends the register response to the client end point and then completes.

Figure 9:
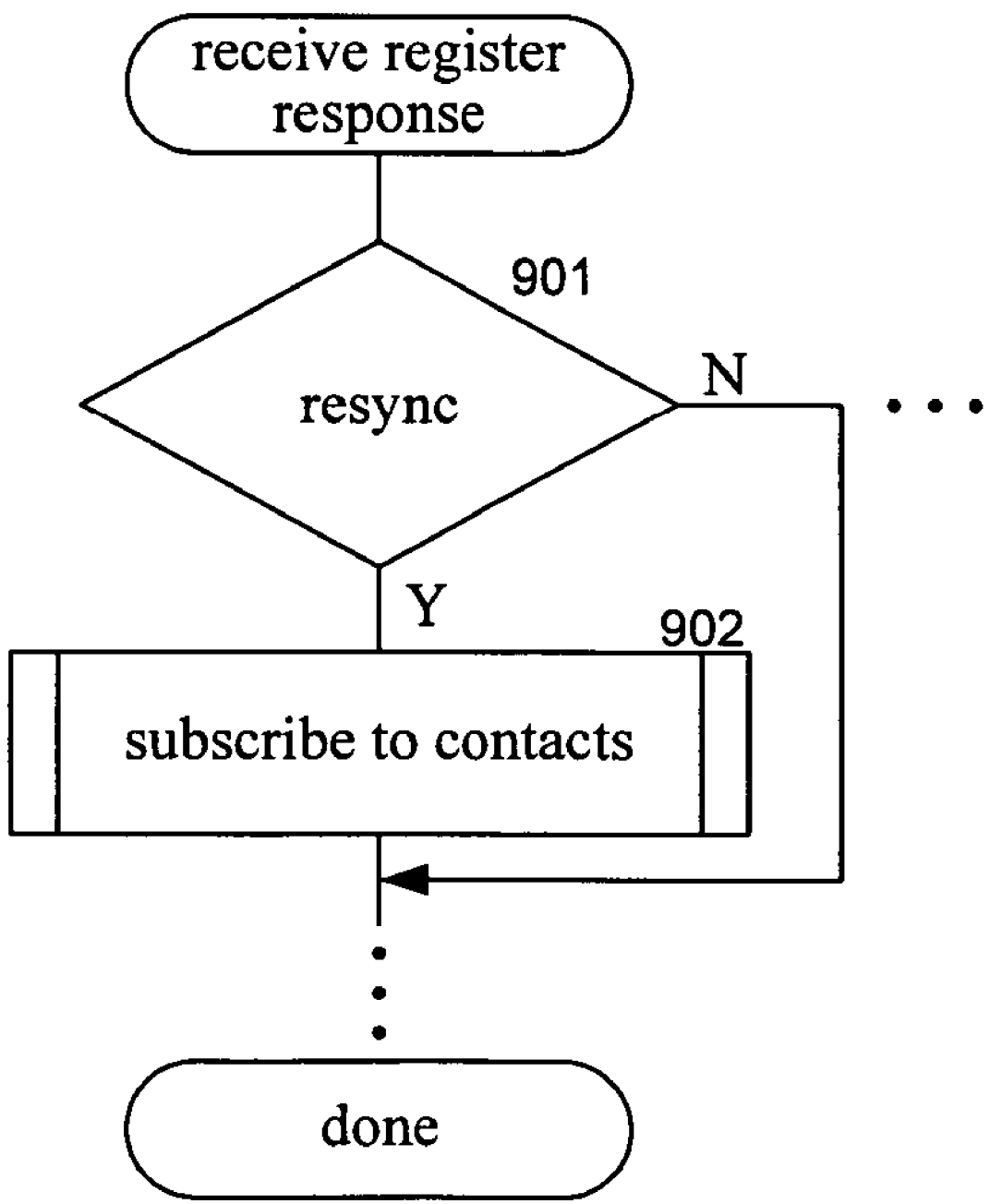
FIG. 9 is a flow diagram that illustrates the processing of the receive register response component of the client side of the synchronization system in one embodiment.

FIG. 9 is a flow diagram that illustrates the processing of the receive register response component of the client side of the synchronization system in one embodiment. The component is invoked when the client end point receives a response to a register request. If the response indicates that re-synchronization may be needed, then the component subscribes to the presence information. In decision block 901, if the register response indicates that re-synchronization is needed, then the component continues at block 902, else the component performs conventional processing of a register response. In block 902, the component invokes the subscribe to contacts component to re-subscribe to the presence information of the contacts. The component then continues with conventional processing of the register response.

From the foregoing, it will be appreciated that specific embodiments of the synchronization system have been described for purposes of illustration, but that various modifications may be made without deviating from the spirit and scope of the invention. For example, the synchronization system can be used to re-synchronize any type of end points (e.g., pairs of client end points). Accordingly, the invention is not limited except as by the appended claims.

We claim:

1. A method for initiating re-synchronization of a first end point and a second end point that communicate via an intermediary server of a server pool, the method comprising:

establishing a session between the first end point and the second end point via a first intermediary server of the server pool; and when the first intermediary server is unavailable and a message of the session is received from the first end point, selecting a second intermediary server that is available so that the first end point and the second end point communicate via the second intermediary server;
forwarding the message to a second intermediary server of the server pool; and
when the second intermediary server receives the message,
determining whether the second intermediary server is a newly selected intermediary server; and
when it is determined that the second intermediary server is a newly selected intermediary server, without forwarding the received message to the second end point, sending a response to the first end point indicating that the end points are possibly not synchronized so that the first end point upon receiving the response effects re-synchronization of the end points.

2. The method of claim 1 wherein the end points and the intermediary servers communicate using the session initiation protocol.

3. The method of claim 2 wherein the session is established as a result of a message sent from the first end point to the second end point.

4. The method of claim 2 wherein the second intermediary server indicates that the end points are possibly not synchronized using an attribute of a response to a register request.

5. The method of claim 1 wherein the intermediary servers are selected using a load balancer.

6. The method of claim 1 wherein the second intermediary server determines that it is newly selected based on persistent information stored by the first intermediary server.

7. The method of claim 1 wherein the first end point is a client and the second end point is a server that provides a service to the client.

8. The method of claim 7 wherein the service is selected from the group consisting of an instant messaging service and a presence service.

9. A method for re-synchronizing a first end point and a second end point that communicate via an intermediary server, the method comprising:
sending from the first end point to the second end point a request to establish a session between the first end point and the second end point;
receiving at a load balancer a request from the first end point to establish a session between the first end point and the second end point;
selecting by the load balancer a first intermediary server through which the session is to be established;
establishing a session between the first end point and the second end point via the first intermediary server;
receiving at the load balancer a message from the first end point to the second end point as part of the established session, wherein
when the first intermediary server is available, sending by the load balancer the received message to the second end point via the first intermediary server;
when the first intermediary server is not available,
selecting by the load balancer a second intermediary server because the first intermediary server is unavailable; and
sending by the load balancer the received message to the second end point via the second intermediary server;
upon receiving the message at the second intermediary server and detecting that the second intermediary server is a newly selected server, sending a response to the first end point indicating that the end points are unsynchronized without forwarding the message to the second end point;
receiving at the first end point the response to the message from the second intermediary server indicating that the end points are unsynchronized; and
after the response is received, sending from the first end point a message to the second end point via the second intermediary server requesting re-synchronization.

10. The method of claim 9 wherein the first intermediary server is unavailable because of a failure.

11. The method of claim 9 wherein the end points are not synchronized when a message sent from the second end point was not forwarded by the first intermediary server to the first end point.

12. The method of claim 9 wherein the message sent from the first end point to the second end point indicates that the first end point supports re-synchronization.

13. The method of claim 9 wherein the communications are via the session initiation protocol.

14. The method of claim 13 wherein the message sent from the first end point to the second end point is a register request.

15. The method of claim 9 wherein the intermediary servers are servers of a server pool.

16. A computer-readable medium containing instructions for controlling a computer system to re-synchronize a first end point and a second end point that communicate via an intermediary server of a server pool, the method comprising:
establishing a session between the first end point and the second end point via an intermediary server of the server pool; and
when an intermediary server receives a message sent from the first end point to the second end point,
determining whether the first end point and the second end point may be not synchronized because the intermediary server that received the message is not the intermediary server through which the session was established;
when it is determined that the first end point and the second end point are synchronized, forwarding the received message to the second end point; and
when it is determined that the first end point and the second end point may not be synchronized, without forwarding the received message to the second end point, sending a response to the message to the first end point indicating that the first end point and the second end point may be not be synchronized so that the first end point upon receiving the response re-synchronizes the end points.

17. The computer-readable medium of claim 16 wherein the end points are not synchronized when a message sent from the second end point was not forwarded by an intermediary server to the first end point.

18. The computer-readable medium of claim 16 wherein the intermediary server determines to indicate to re-synchronize when the intermediary server that receives the message from the first end point was not the intermediary server through which the session was established.

19. The computer-readable medium of claim 16 wherein the communications are via the session initiation protocol.

20. The computer-readable medium of claim 16 wherein the servers are from a server pool.

* * * * *